Sept. 16, 1941.  R. BLAHO  2,255,964
BUSHING OR RING, PROCESS OF MAKING SAME, AND MOUNTING THEREFOR
Filed Oct. 4, 1937  3 Sheets-Sheet 1
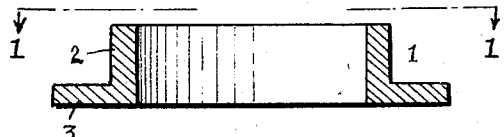
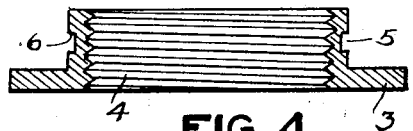
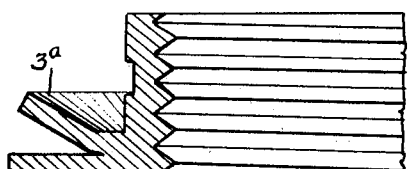
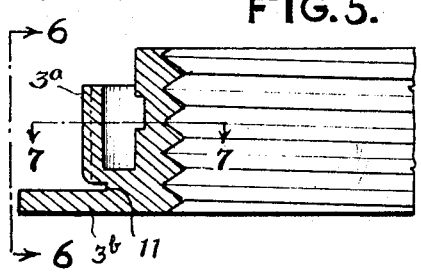
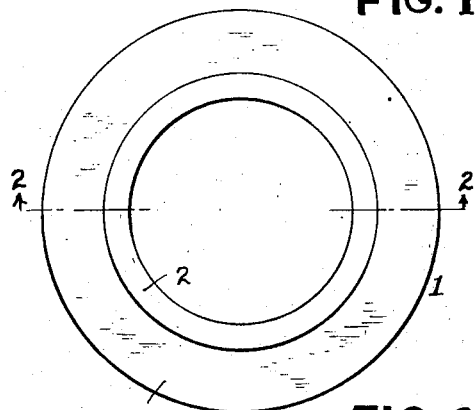
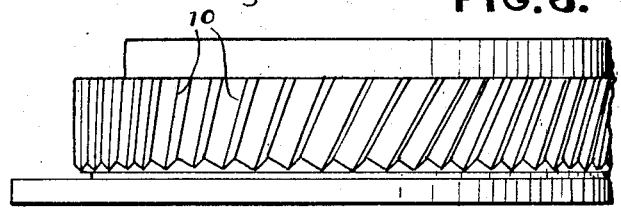
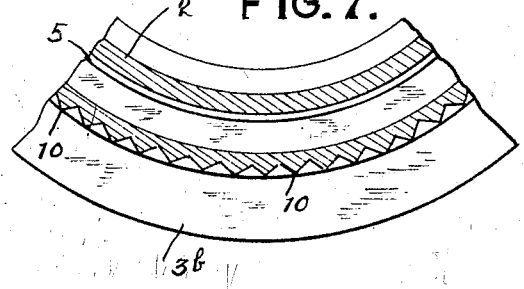
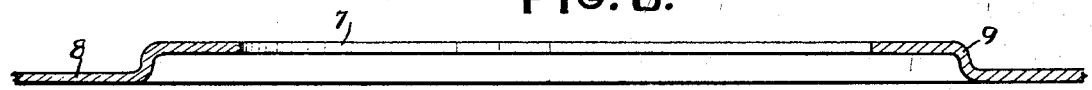
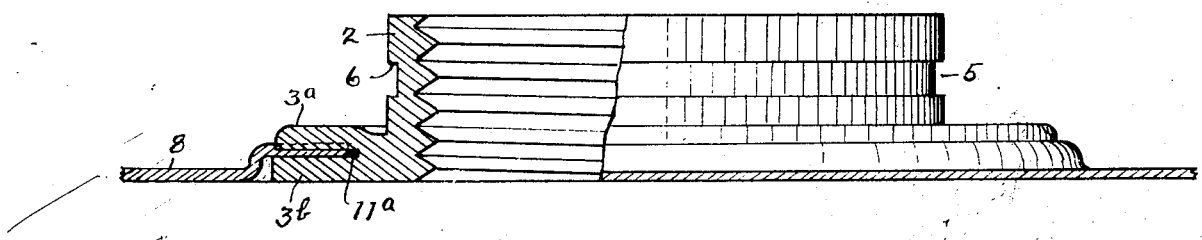
INVENTOR.
RUDOLPH BLAHO.
BY
ATTORNEY.

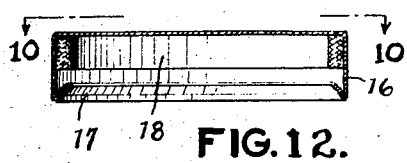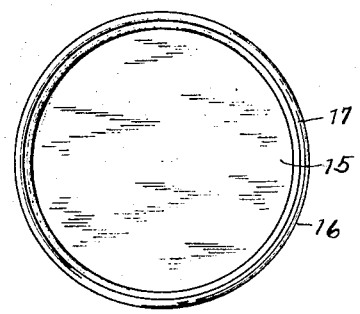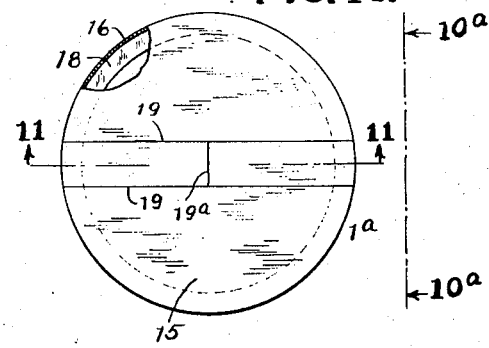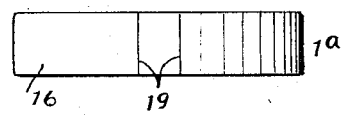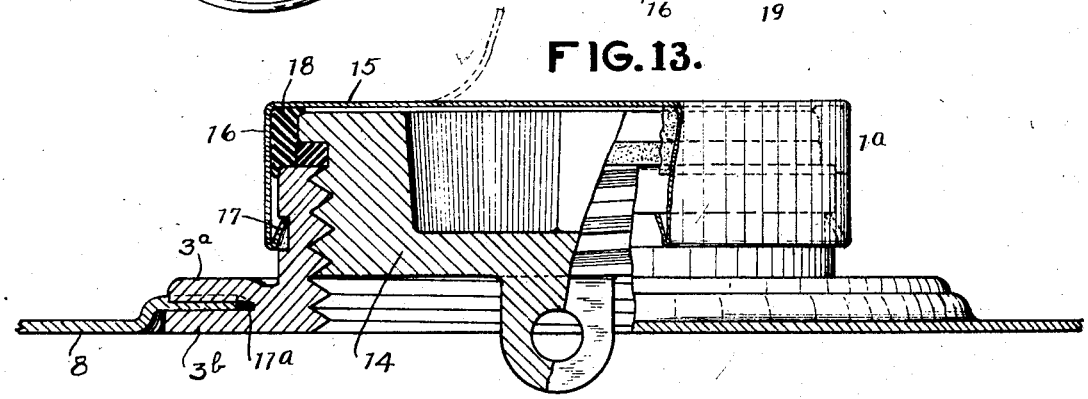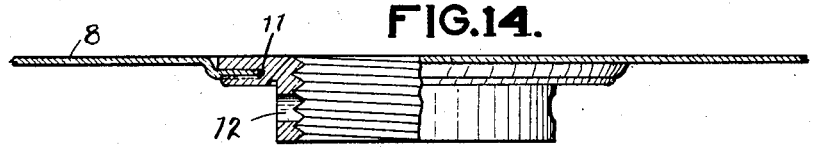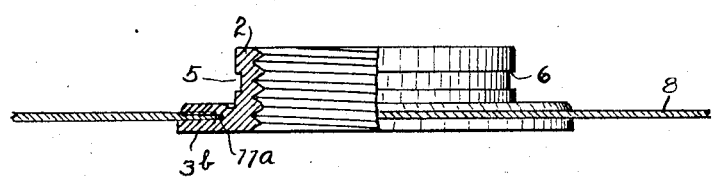

Sept. 16, 1941.   R. BLAHO   2,255,964
BUSHING OR RING, PROCESS OF MAKING SAME, AND MOUNTING THEREFOR
Filed Oct. 4, 1937   3 Sheets-Sheet 3

INVENTOR.
RUDOLPH BLAHO.
BY
*Geo. B Pitts*
ATTORNEY.

Patented Sept. 16, 1941

2,255,964

UNITED STATES PATENT OFFICE 2,255,964

BUSHING OR RING, PROCESS OF MAKING SAME, AND MOUNTING THEREFOR

Rudolph Blaho, Cleveland, Ohio, assignor to Metal Fittings, Inc., Cleveland, Ohio, a corporation of Ohio Application October 4, 1937, Serial No. 167,313

9 Claims. (Cl. 29—148.2)

This invention relates to bushings, flanges and/or rings, the mounting thereof in a metal wall, and the closing and sealing accessories therefor.

This invention also relates to containers wherein is provided a flange or bung ring which is securely mounted in the container wall to receive the container bung and which may include, when desired, provision for a sealing means adapted to make unauthorized access to the bung plainly visible.

One object of this invention is to provide an improved bushing, flange and/or ring which by mechanical means can be easily mounted in a metal wall.

Another object is to provide an improved process of making bushings or rings.

Another object of the invention is to provide in the metal wall of a casing, container and the like, a closure support constructed and mechanically attached to the wall in a manner which (a) prevents both endwise and rotative movement of the support, (b) adequately resists all strains on the support due to positioning or removal of the closure and (c) provides a liquid tight connection between wall and support.

Another object of this invention is the provision of an improved process of mounting closure supports in metal parts or walls.

Another object of the invention is to provide an improved construction of mechanically attached bushings, flanges and/or rings and mountings therefor which are simple and easily produced, and wherein the ring is provided with the required number of threads, leakage around the ring and its support is prevented, embossment of the supporting wall is reduced, or done away with entirely when desired, to eliminate breakage and resultant spoilage of the metal support, full drainage is attained and sealing against unauthorized access to the closure or its opening is readily provided for in a manner, which makes tampering without detection impossible.

A further object of the invention is to provide a sealing cap the construction of which permits application by hand and affords a permanent seal which must be broken before access to the contents of the container can be had, thereby making detection of unauthorized access to the container contents positive.

Other objects of the invention will be apparent to those skilled in the art to which my invention relates from the following description taken in connection with the accompanying drawings, wherein Fig. 1 is a plan view of a blank which may be forged from suitable material but is preferably a stamping.

Fig. 2 is a section on the line 2—2 of Fig. 1.

Figs. 3, 4 and 5 are views illustrating certain steps of my process (Figs. 4 and 5 being enlarged).

Fig. 6 is a fragmentary side elevation of the completed ring.

Fig. 7 is a fragmentary section on the line 7—7 of Fig. 5.

Figs. 8 and 9 are views showing the steps of mounting a ring in a metal wall where the latter is up-set or embossed to form a seat.

Fig. 10 is a plan view of a sealing cap.

Fig. 10a is a side elevation on the line 10a—10a of Fig. 10.

Fig. 11 is a sectional view of a sealing cap on the line 11—11 of Fig. 10.

Fig. 12 is a bottom plan view of the sealing cap.

Fig. 13 is a view, partly in side elevation and partly in section of a container wall having a ring mounted therein and a sealing cap in position.

Fig. 14 is a view showing the ring mounted in a reverse position as compared to Fig. 9.

Fig. 15 is a view similar to Fig. 9, but showing the ring mounted in the wall where the up-setting of the wall is omitted.

Figure 16:
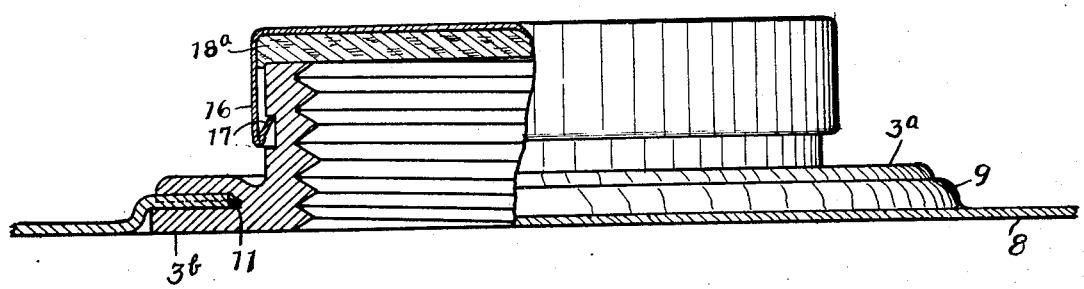
Fig. 16 is a view, partly in side elevation and partly in section, showing a modified form of construction.

In the drawings, 1 indicates a blank of annular shape forged or stamped from suitable metal or metal alloy to provide a neck 2 and an outwardly extending flange 3. The inner wall of the neck 2 is, by preference, first threaded, as shown at 4, although this step may be effected after one or more of the other steps of my process have been carried out. The next step, where the ring is to be sealed against tampering without detection by a sealing cap 1a (see Fig. 10), as later set forth, is to form a recess 5 in the outer wall of the neck 2 to provide a circumferential shoulder 6 for engagement by the cap 1a. The threading as shown at 4 is provided by a suitable tap and the recess 5 is formed by a suitable machining operation. Next, by means of a suitable tool (not shown) movable radially inwardly and causing relative rotative movement between the tool and blank 1, I split the flange 3 circumferentially in a plane substantially parallel to and between its opposite surfaces, from its periphery inwardly a predetermined distance, forming inner and outer annular sections 3a, 3b (the inner section being the section adjacent the neck 2). The splitting tool operates in a plane nearer the inner surface of the flange 3 than its outer surface, so that because of the reduced thickness of the metal at the point where the inner section joins the inner or unsplit portion of the flange 3, the inner section 3a will yield to the pressure of the tool and bend laterally, as shown in Fig. 4. The tool is shaped in cross section to provide a flat outer face which operates in the above defined plane and an inner face which diverges away from the outer face to force the section 3a laterally as the tool moves inwardly. The tool for effecting the splitting step preferably consists of a series of rotary knives arranged in a circular relation and mounted to move simultaneously inwardly radially, while the ring 1 (which is mounted on a suitable collet) rotates.

Next, the laterally bent section 3a is bent or turned up by a suitable tool (not shown) into a position at substantially right angles to the section 3b as shown in Fig. 5, to form a clamping collar which is inserted through an opening in a metal wall (see opening 7 in wall 8, Fig. 8). The turning-up tool includes an annular mandrel which engages the inner face of the flange 3 around the neck 2 and a plurality of pressure rolls arranged in a circular relation and mounted to move radially inwardly while the ring 1 rotates. Except for the use of pressure rolls instead of cutters, the tool for turning up the section 3a is similar to the tool which splits the ring flange 3a; also, it will be obvious that the ring 1 may be held stationary and the cutters and pressure rolls revolved for effecting their respective operations.

Next, I form by a suitable cutting tool in the outer wall of the collar and entirely therearound a series of grooves between its upper and lower circumferential edges to provide ribs 10 the terminating edges of which are relatively sharp for a purpose later set forth. The cutting tool is preferably of the knurling type and by preference the tool is arranged to cut the grooves at an angle to the axis of the ring, the angle being predetermined with respect to the direction of the screw threads 4 so that when the bushing or ring is mounted in a wall, the ribs 10 extend in the same direction as the threads 4.

Next, the outer wall of the collar 3a adjacent the section 3b is removed by a suitable tool to form an undercut 11 (see Fig. 5), thereby providing a space for a sealing gasket when the bushing is mounted in a metal wall. If desired, this space may be provided in connection with the above described step of turning-up the collar, by arranging the mandrel and the tools to co-act in bending the flange 3a at a point slightly remote from the end of the split.

As a final step, where the bushing or ring is to be mounted in the wall of a container, in the position shown in Fig. 14, I drill or punch one or more drainage holes 12 in the neck 2, as shown in this view; but it will be obvious that such holes may be drilled or punched as the first step or following any of the other steps in completing the ring.

In mounting the ring in a metal wall I first punch a hole therein, for example, as shown at 7 in Fig. 8. Next, a gasket 13, such as a rubber band is placed in the undercut 11. Next, the bushing is positioned in the hole 7 with the flange section 3b in engagement with one face of the wall. Finally, by means of a suitable press having die parts, the collar 3a is folded or bent down under pressure into engagement with the opposite face of the wall 8, the effect of which is to force the ribs 10 into the metal of the wall, thereby effecting an interlock between the flange 3 and wall 8 to prevent turning. As the flange section 3a and collar 3b engage the opposite faces of the wall 8, the bushing is held against endwise movement, and by reason of the clamping of the metal wall between these parts, with the ribs or teeth 10 pressed into the metal of the wall, the bushing is positively locked against rotative movement to resist strains incident to tightening and removal of a closure such as a screw plug 14.

By embossing the wall 8 as shown at 9 in Figs. 8, 9, 13 and 14 (which may be done simultaneously with the punching of the hole 7), the flange section 3b may be disposed flush with the wall 8.

Figs. 10, 10a, 11 and 12, illustrate the sealing cap 1a, which is formed of thin resilient metal stock, whereby it may be easily and economically made. The cap comprises a top wall 15 and skirt 16 having a diameter which permits it to fit in close relation to the side wall of the ring neck 2, the circumferential marginal edge portion of the skirt being bent back on itself within the skirt to form a spring locking flange 17, normally disposed at an upwardly inclined angle and arranged when positioned over the ring neck 2, to ride the outer wall thereof and expand inwardly radially throughout its circumference into engagement with or under the shoulder 6, and thereby automatically lock the cap in position against removal. The cap 1a is provided with a suitable gasket 18, which supplements the sealing of the plug gasket 14a, as shown in Fig. 13. The height of the skirt 16 is preferably predetermined with respect to the distance from the top of the plug 14 (that is, its top surface when a wrench socket is formed therein or the top of the wrench lug) so that the lower circumferential edge of the skirt 16, when the cap is in position, lies in close relation to the lower end wall of the recess 5 to prevent the insertion of a tool or other device between such edge and end wall. The top wall of the cap 1a is scored along one or more lines to facilitate its removal, as shown in dotted lines in Fig. 13; for example, parallel lines 19 which extend across the top wall and down the skirt to points near its opposite free edges, and a connecting line 19a. It will be noted that the cap is so shaped that tools of any kind are not required to position it and/or bend its skirt around a shouldered or enlarged end of the ring neck 2; on the other hand, due to the employment of the resilient flange 17, the cap may be positioned by hand, by pressing it downwardly, since the flange 17 automatically engages the shoulder 6 and such operation compresses the gasket 18.

The sealing cap 1a is employed to detect unauthorized access to the container contents, and since it fits closely around the side wall of the ring neck 2 and the skirt is re-inforced at its lower end by the continuous locking flange 17, its walls have a rigid relation to the neck and plug, when the latter is employed, whereby possible manipulation of the cap to remove it without detection is eliminated.

It will be noted that the cap may be employed as the sole closure device for the ring, at least for the initial filing and shipment of the container, as shown in Fig. 16; but in this arrangement I employ a suitable disk of cork or semi-compressible material, as shown and the skirt 16 is reduced in height so that its locking flange may operatively engage the shoulder 6. In this arrangement the scoring of the cap may be omitted or restricted to a portion of the top wall of the cap to avoid danger of leakage.

It will be obvious that instead of employing a plug such as shown in Fig. 13, the plug may be of the type which, when screwed into position, is flush, or substantially flush with the outer end of the ring neck 2. In this arrangement the cap skirt 16 is of proper length to accommodate the gasket and operatively engage the shoulder 6, the gasket in this arrangement being preferably of annular shape.

Figure 17:
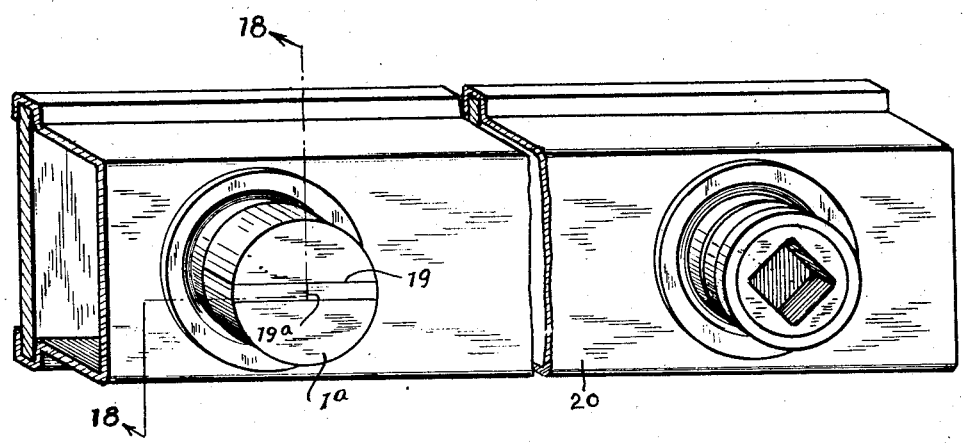
Fig. 17 is a perspective view showing the invention applied to a different form of container or enclosure device.
Figure 18:
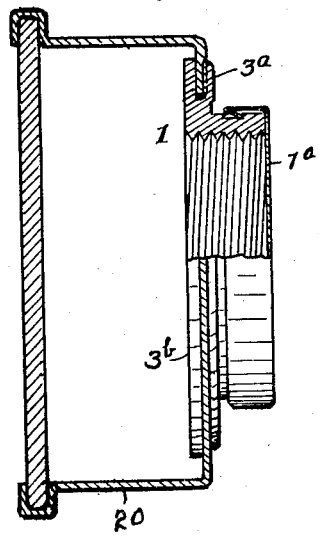
Fig. 18 is a section on the line 18—18 of Fig. 17.

In Figs. 3 to 16 I have illustrated my invention as applied to the metal wall (side or end wall) of a container, whereas in Figs. 17 and 18 it is shown as applied to an enclosure for electrical connections adapted to be incorporated in a wall. In such enclosures it is customary to provide a plurality of openings for the wires with bushings therein and to close the openings not used. My construction lends itself to such application and provides for the closing of the openings by a plug or a cap or by both if desired. In these views, 20 indicates an enclosure adapted to be incorporated in a wall and having mounted in it bushings of the construction hereinbefore described, certain thereof being shown closed by a plug and others being shown closed by a cap. While the closure herein shown is formed of thin sheet metal, it will be obvious that the bushing may be applied to walls of greater thickness.

In carrying out my process of forming the ring it will be obvious that certain of the steps may be carried out simultaneously, for example the steps of splitting the flange and rolling it into an angular position.

My construction of ring and its mounting in a metal wall is advantageous for many reasons, among which may be mentioned the fact that no extra metal which would increase its cost and weight in shipment, is required to secure the ring to a metal wall. Also, embossment of the metal around the opening in the wall may be entirely eliminated (see Fig. 15) and where it is desired to dispose the ring flange flush with one face of the wall, as shown in Figs. 13 and 14, the embossment is materially reduced as slightly more than half the thickness of the ring flange is required to attain this result. Furthermore, the dies employed to effect the mounting of the ring have no movable or articulating parts.

To those skilled in the art to which my invention relates many changes in construction and widely differing embodiments and applications of the invention will suggest themselves without departing from the spirit and scope thereof. My disclosures and the description herein are purely illustrative and are not intended to be in any sense limiting.

What I claim is:

1. The herein disclosed process of forming bushings which consists in shaping metal to form an annular blank having a neck and an outwardly extending flange, then in splitting the flange in a plane between its opposite faces inwardly from its periphery throughout its circumference a predetermined distance, then in bending the inner split section of the flange laterally into substantially concentric relation to the neck, and finally cutting grooves in the outer face of the laterally bent flange section between its upper and lower circumferential edges, to form thereon a plurality of locking ribs.

2. The herein disclosed process of forming bushings which consists in shaping metal to form an annular blank having a neck and an outwardly extending flange, then in forming in the outer side wall of said neck an annular recess to provide a shoulder below the outer end of said neck, then in splitting the flange in a plane between its opposite faces inwardly from its periphery throughout its circumference a predetermined distance, and finally bending the inner split section of the flange laterally into substantially concentric relation to the neck.

3. A bushing and the like comprising a neck and a laterally extending flange at one end thereof and a collar integrally connected to said flange and disposed in spaced concentric relation to said neck, the outer surface of said collar being provided with locking ribs extending inwardly from its circumferential edge.

4. A bushing as claimed in claim 3 wherein the outer surface of said collar is provided with locking ribs extending inwardly from its circumferential edge at an angle to its axis.

5. A bushing as claimed in claim 3 wherein the outer wall of the collar adjacent the inner face of the flange is cut away to form a circumferential groove and said wall is provided throughout its circumference with locking ribs extending from said groove toward the free edge of said collar.

6. A metal wall formed with an opening, in combination with a bushing comprising a neck extending through said opening and a circumferential laterally extending flange at one end thereof, said flange being split between its opposite faces inwardly from its periphery to form annular flange sections engaging under pressure the opposite faces of said wall surrounding the opening therein, the engaging face of one of said flange sections having ribs embedded in the metal of said metal wall to form an interlocking connection therewith.

7. A metal wall formed with an opening, in combination with a bushing having a flange secured to said wall and a neck extending through the opening therein and provided with a circumferential shoulder disposed inwardly of and parallel to the free end of said neck, and a sealing cap fitting over and enclosing the free end of said neck, the inner side wall of said cap being provided with a continuous circumferential resilient flange arranged to engage said shoulder to lock said cap in position.

8. The herein disclosed process of forming bushings which consists in shaping metal to form an annular blank having a neck and an outwardly extending flange, then in splitting the flange in a plane between its opposite faces inwardly from its periphery throughout its circumference a predetermined distance, then in bending the inner split section of the flange laterally into substantially concentric relation to the neck and finally cutting grooves at an angle to the axis of the blank in the outer face of the laterally bent flange section to form locking ribs.

9. The herein disclosed process of forming bushings which consists in shaping metal to form an annular blank having a neck and an outwardly extending flange, then in splitting the flange in a plane between its opposite faces but nearer its inner face than its outer face, inwardly from its periphery throughout its circumference a predetermined distance, bending the inner split section of the flange laterally into substantially concentric relation to the neck and finally cutting away the metal at the base of the laterally bent flange section adjacent the outer flange section to form a gasket groove.

RUDOLPH BLAHO.